United States Patent [19]
Wuidart

[11] Patent Number: 5,994,917
[45] Date of Patent: Nov. 30, 1999

[54] METHOD AND APPARATUS FOR SEQUENCING AN INTEGRATED CIRCUIT

[75] Inventor: Sylvie Wuidart, Le Cade, Belgium

[73] Assignee: SGS-Thomson Microelectronics S.A., Saint Genis, France

[21] Appl. No.: 08/796,430

[22] Filed: Feb. 10, 1997

[30]     Foreign Application Priority Data

Feb. 19, 1996  [FR]  France .................................. 96 02030

[51] Int. Cl.$^6$ ............................ H03K 19/00; H03K 3/84
[52] U.S. Cl. .................................. 326/8; 380/48; 327/99; 327/164
[58] Field of Search ........................... 326/8, 93; 380/48; 327/99, 164, 407

[56]     References Cited

U.S. PATENT DOCUMENTS

| | | | |
|---|---|---|---|
| 4,827,111 | 5/1989 | Kondo | 235/380 |
| 5,289,050 | 2/1994 | Ogasawara | 326/93 |
| 5,315,181 | 5/1994 | Schowe | 326/93 |
| 5,404,402 | 4/1995 | Sprunk | 380/4 |
| 5,604,452 | 2/1997 | Huang | 326/93 |
| 5,652,536 | 7/1997 | Nookala et al. | 326/93 |

FOREIGN PATENT DOCUMENTS 2 596 897  10/1987  France .

*Primary Examiner*—Jon Santamauro
*Attorney, Agent, or Firm*—Wolf, Greenfield & Sacks, P.C.

[57]     ABSTRACT

A method and apparatus for sequencing an integrated circuit which receives an external clock signal consists of the use of an internally generated random clock signal and of the use of either of these clock signals depending on the instruction to be performed.

23 Claims, 1 Drawing Sheet

METHOD AND APPARATUS FOR SEQUENCING AN INTEGRATED CIRCUIT

BACKGROUND OF THE INVENTION

1. Field of the Invention

The present invention relates to a method and apparatus for sequencing an integrated circuit, and can be applied to integrated circuits designed for chip cards or circuit boards.

2. Discussion of the Related Art

Integrated circuits designed for chip card or circuit board type applications usually have an input designed to receive an external clock signal. This clock signal is used to generate an internal clock signal capable of ensuring the operation of the integrated circuit. Therefore, the internal operation of the internal circuit is sequenced with respect to the external clock signal.

For chip card applications, circuit board applications, or for any other application requiring high operating security, it is imperative to have the ability to prevent a situation where the presence of parasites on the external clock signal could disturb the internal clock signal and modify the operation of the integrated circuit. A disturbing action by parasites would be one way of carrying out fraudulent activity.

It has become common practice to use a filtering circuit in the internal clock signal generator. This filtering circuit is capable of overcoming disturbances of this kind in the external clock signal. An example of such a generator is described in the French patent No. 2 708 809. Structures also exist that can be used to obtain an internal clock signal with characteristics that depend little on variations in temperature or manufacturing method. A structure of this type is described for example in the patent No. FR 2 707 058.

However, it has been discovered that such structures, while they make it possible to prevent the disturbing of the internal operation of an integrated circuit, do not however make it possible to prevent another type of fraud, namely the observation of the behavior of the integrated circuit. Since the internal clock signal is based on the external clock signal, this external clock signal may be used as a synchronization signal. This would, for instance, enable an ill-intentioned individual in particular to obtain confidential data or even information by which the individual could reconstitute the program performed by the integrated circuit.

SUMMARY OF THE INVENTION

The present invention provides a method and an apparatus which prevents an external clock signal from possibly serving also as an internal synchronization signal so as to protect the integrated circuit from corresponding types of fraudulent activity.

An embodiment of the present invention is directed to an integrated circuit which internally generates a random clock signal, which allows the integrated circuit to use either the external clock signal or the random clock signal according to the instruction to be performed by the integrated circuit. Preferably, the random clock signal will be used for operations that process confidential data elements.

Also, in another embodiment of the invention, the integrated circuit can use the random clock signal by default so that the external clock signal is switched over only for operations requiring external synchronization. Therefore, the internal operation of the integrated circuit is no longer synchronous with the external clock signal except for operations which have to be synchronized.

The internal random clock signal being completely independent from the external clock signal, the integrated circuit can go on operating even if no external clock signal is applied, using the internal clock signal. In particular, all the secured checking operations can go on.

DETAILED DESCRIPTION

Figure 1:
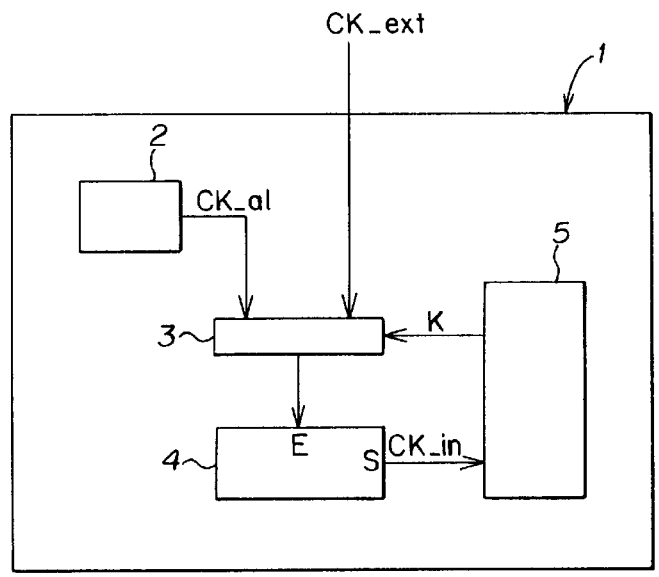
FIG. 1 shows a block diagram of an integrated circuit according to the invention.

FIG. 1 shows a block diagram of an integrated circuit 1 enabling the implementation of the invention. The integrated circuit 1 has an input to receive an external clock signal CK-ext. According to the invention, it furthermore has a random generator 2 which provides a random clock signal CK-al.

The two clock signals CK-ext and CK-al are applied to two inputs of a switch-over circuit 3. The circuit 3 is capable of switching either of the clock signals over to an input E of a circuit for the generation of an internal clock signal CK-in, this switch-over being done according to the level of a binary command K which may be 0 or 1. This internal clock signal CK-in is applied to the circuitry of the integrated circuit.

This circuitry 5 is not shown in detail in the figure, but it typically has memory circuits in which there are stored, in particular, the application program and confidential data elements (an identification code for example) and means to manage the external exchanges and these memory circuits (processor, microcontroller or other circuits).

The switch-over circuit 3 receives the binary switch-over command K from circuitry 5. Depending on whether its logic state is low or high, this command enables either the random clock signal or of the external clock signal to be switched over to the input E of the clock signal generator circuit 4.

Figure 2:
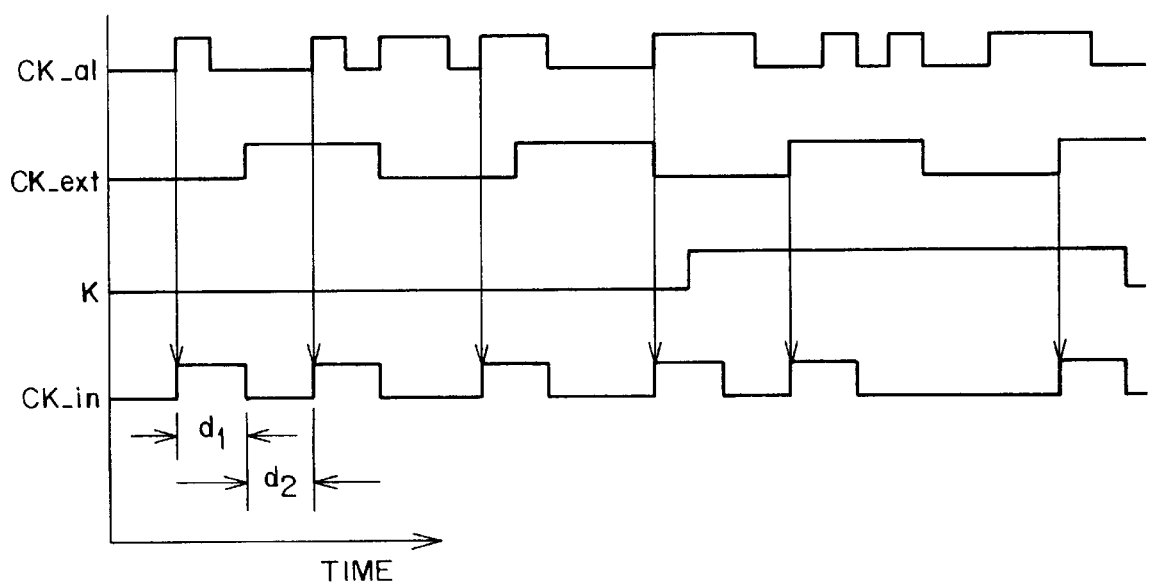
FIG. 2 shows a timing diagram of the corresponding clock signals.

This generator circuit 4 provides an output signal whose pulses are stabilized 15 in time. Typically, and as shown in FIG. 2, the detection of a leading edge on the input E makes the output signal go from a low state to a high state during a calibrated period of time d1, and then the output signal goes back to the low state for at least a determined period of time d2. It is only at the end of this period d2 that the generation circuit can respond to a new pulse at its input E. A generation circuits, such as the circuits described in the patent application No. FR 2 708 809 may be an appropriate generation circuit which could be used in the present invention.

An integrated circuit according to the invention, comprises a random generator capable of providing a random clock signal and a switch-over circuit capable of either the external clock signal or the random clock signal as an input pulse signal of the generator 4 of the internal clock signal.

The switch-over circuit thus makes it possible to impose the random clock signal as an input pulse signal for operations processing confidential data elements (contained in the memory circuits of the circuitry 5). Also, the switch-over circuit enables the use of the external clock signal for operations requiring external synchronization. Therefore, the confidential data elements contained in the integrated circuit are protected from fraudulent activity since it is no longer possible to find any external synchronization in order to observe the operations of the integrated circuit.

In one embodiment of the invention, the integrated circuit according to the invention advantageously makes it possible to impose the random clock signal by default as the input pulse signal and to use the external clock signal as an input pulse signal only for operations of the integrated circuit requiring external synchronization.

With an internal sequencing method of this kind, it then becomes impossible to find an external synchronization. The only operations of the integrated circuit that will be synchronized with the external clock signal will be those relating to the transmission of data elements with an external system, for example transmission by a serial link.

In practice, when the integrated circuit carries out the program and when it reaches instructions corresponding to a transmission (sending or receiving) with an external system, it activates the command K(K=1) to temporarily switch the external clock signal to the generator circuit input.

As soon as the transmission is ended, the integrated circuit deactivates the command K(K=0) to again switch the random clock signal to the generator circuit input.

A sequencing method of this kind is illustrated in FIG. 2: so long as the command K is at zero, the internal clock signal CK-in is based on the random clock signal. As soon as the command K goes to one, the internal clock signal CK-in is based on the external clock signal.

Although the internal sequencing method according to this embodiment is particularly simple to implement, the internal sequencing method enables the integrated circuit to work always at its highest speed. When the sequencing is based on the random clock signal, it is possible to work at the optimum speed of the integrated circuit (for example 40 MHz). When it is based on the external clock signal, the speed of the integrated circuit is then matched with the external conditions (lower speed, for example in the range of 10 MHz).

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A method for sequencing an integrated circuit, the method comprising the steps of:
   receiving an external clock signal by the integrated circuit;
   generating a random clock signal internal to the integrated circuit; and
   imposing either the external clock signal or the random clock signal as a pulse signal on the integrated circuit according to the operation to be performed by the integrated circuit.

2. A method of claim 1, wherein the random clock signal is imposed at least for operations processing confidential data elements and the external clock signal is imposed at least for operations of the integrated circuit requiring an external synchronization.

3. A method of claim 1, wherein the random clock signal is imposed as a pulse signal by default and the external clock signal is used only for operations of the integrated circuit requiring an external synchronization.

4. A method of claim 2, wherein the random clock signal is imposed as a pulse signal by default and the external clock signal is used only for operations of the integrated circuit requiring the external synchronization.

5. An integrated circuit comprising an input to receive an external clock signal and a circuit for the generation of an internal clock signal, further comprising a generator of a random clock signal and a circuit capable of switching over the external clock signal or the random clock signal to the input of said generation circuit according to the instruction to be performed by the integrated circuit.

6. An integrated circuit according to claim 5, sending a command for the switching over of the random clock signal at least for operations processing confidential data elements and a command for the switching over of the external clock signal at least for operations requiring an external synchronization.

7. An integrated circuit according to claim 5, wherein said circuit sends a command, by default, to switch over the random clock signal and wherein it sends a command to switch over the external clock signal only for operations requiring external synchronization.

8. An integrated circuit according to claim 6, wherein said circuit sends a command, by default, to switch over the random clock signal and wherein it sends a command to switch over the external clock signal only for operations requiring external synchronization.

9. A circuit for sequencing an integrated circuit, the circuit comprising:
   a random generator which generates a first secure output clock signal which cannot be monitored externally to the circuit;
   a switch-over circuit which accepts the first secure output clock signal of the random generator and an external clock signal and switches between the first secure output clock signal and the external clock signal to provide a second secure output clock signal; and
   a clock signal generator circuit which accepts the second secure output clock signal of the switch-over circuit and provides a third secure output clock signal to the integrated circuit.

10. The circuit of claim 9, wherein the circuit for sequencing the integrated circuit includes the integrated circuit in a single integrated circuit package.

11. The circuit of claim 10, wherein the switch-over circuit is responsive to a command signal from the integrated circuit.

12. The circuit of claim 10, wherein the second clock signal is selected by the switch-over circuit when external sequencing is required by operations of the integrated circuit.

13. The circuit of claim 10, wherein the first clock signal is selected by the switch-over circuit when secure sequencing is required by operations of the integrated circuit.

14. The circuit of claim 10, wherein the third secure output clock signal is stabilized by the clock signal generator circuit by making the third secure output clock signal transition from a low state to a high state for a first predetermined period of time, and by making the third secure output clock signal return to the low state for a second predetermined period of time after the end of the first predetermined period of time.

15. A method for sequencing an integrated circuit comprising steps of:
   generating a secure clock signal;
   accepting an external clock signal;
   selecting either the secure or external clock signal for output as a selected clock signal according to an operation performed by the integrated circuit; and generating a stabilized clock signal to the integrated circuit based upon the selected clock signal.

16. The method of claim 15, wherein the generating step includes the steps of:

generating a high signal as the stabilized clock signal for a first predetermined period of time upon detection of a leading edge of the selected clock signal; and generating a low signal after the first predetermined period of time and for a second predetermined period of time, regardless of the value of the selected clock signal.

17. The method of claim 16, wherein the secure clock signal is selected when secure sequencing is required by the operation performed by the integrated circuit.

18. The method of claim 16, wherein the external clock signal is selected when external sequencing is required by the operation performed by the integrated circuit.

19. The method of claim 16, wherein the secure clock signal is selected by default and the external clock signal is selected only when external sequencing is required by operations of the integrated circuit.

20. A system for sequencing an integrated circuit, the system comprising:

a first clock signal which is provided externally to the integrated circuit by an external means;

means for internally generating a second clock signal; and means for providing a third clock signal to the integrated circuit based upon the first clock signal and second clock signal, wherein the third clock signal is provided according to an operation performed by the integrated circuit.

21. The system of claim 20, wherein the means for providing a third clock signal selects either the first or second clock signal as the third clock signal.

22. The system of claim 20, wherein the means for providing includes means for selecting first clock signal as the third clock signal when secure sequencing is required by the operation performed by the integrated circuit.

23. The system of claim 20, wherein the means for providing includes means for selecting the second clock signal as the third clock signal when external sequencing is required by the operation performed by the integrated circuit.

* * * * *